April 15, 1969 E. A. MEYER 3,438,664
STRUCTURAL ASSEMBLY AND CLIP
Filed Nov. 7, 1967
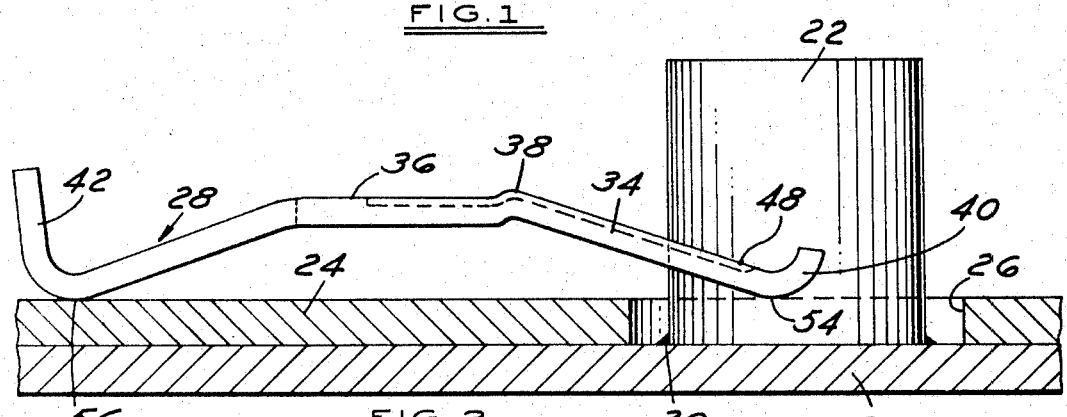
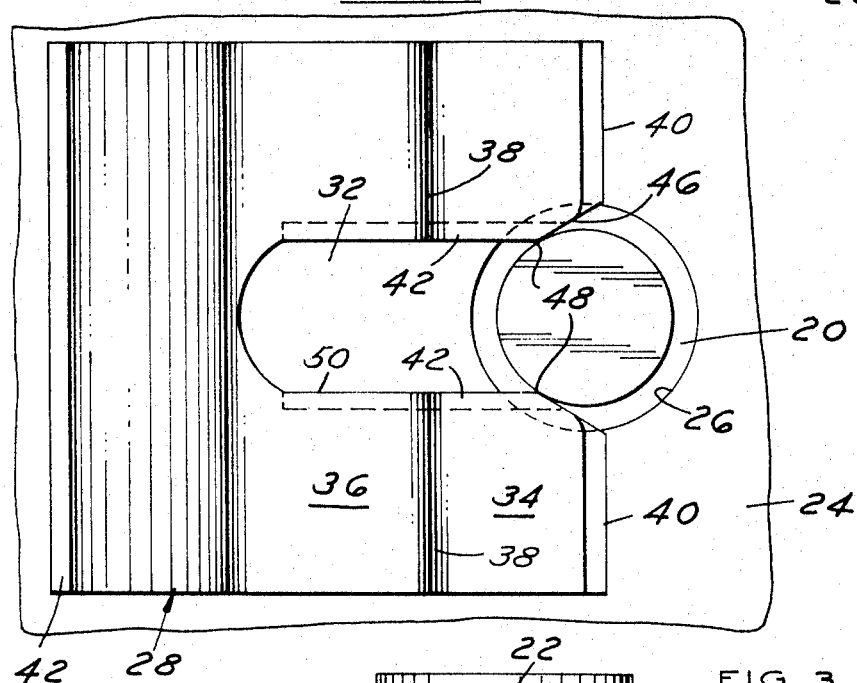
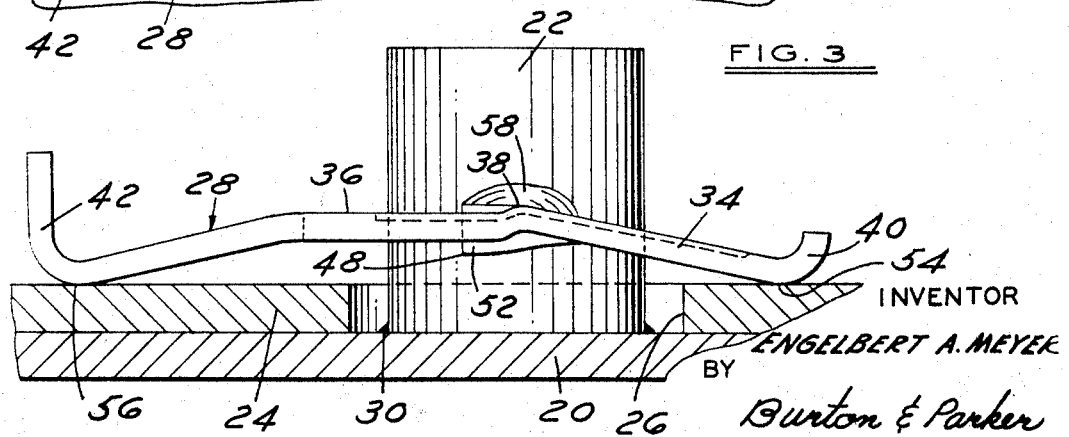
INVENTOR
ENGELBERT A. MEYER
BY Burton & Parker
ATTORNEYS

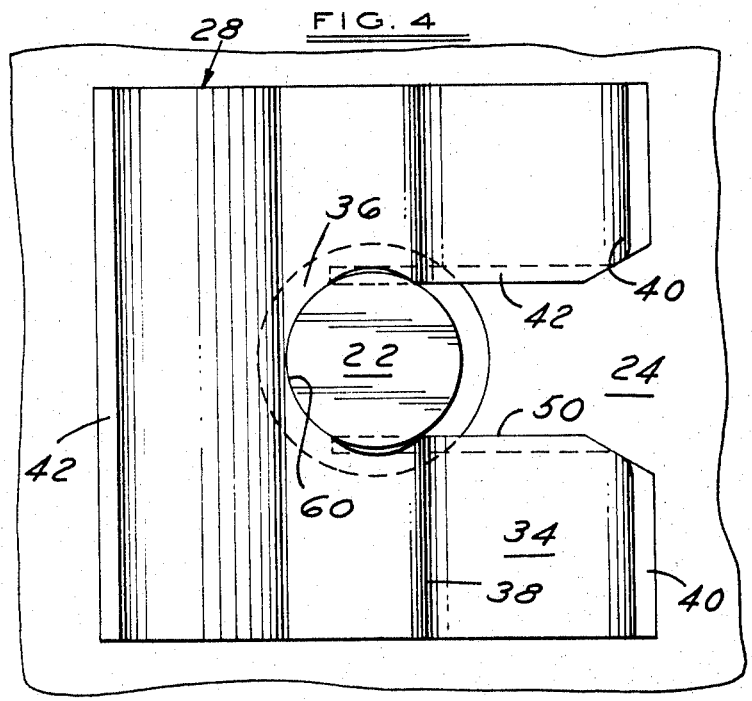
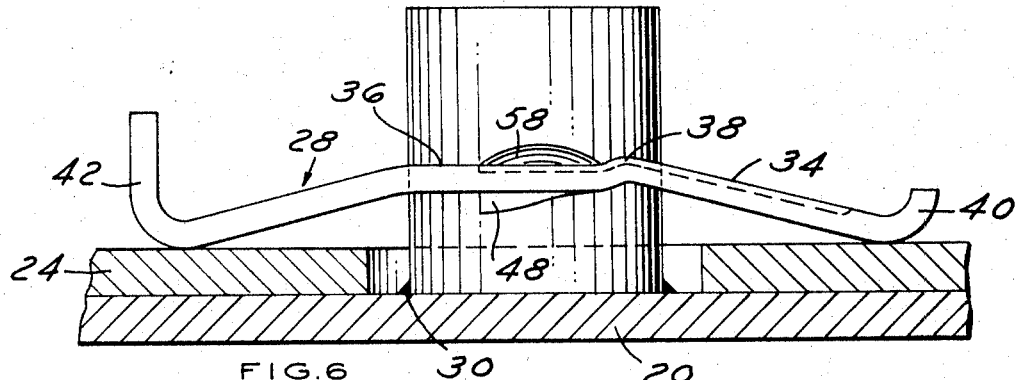
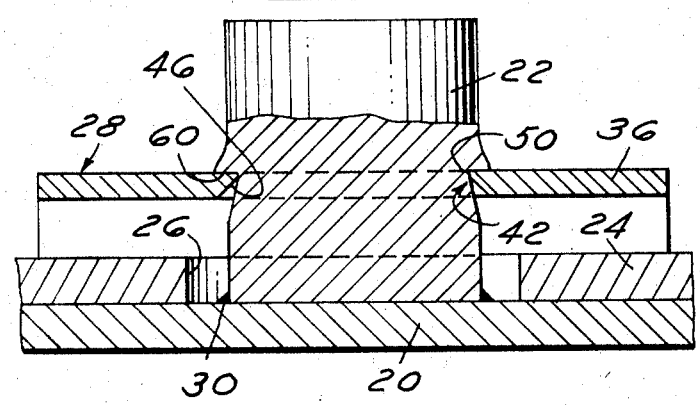

April 15, 1969  E. A. MEYER  3,438,664
STRUCTURAL ASSEMBLY AND CLIP
Filed Nov. 7, 1967  Sheet 3 of 3

INVENTOR
ENGELBERT A. MEYER
BY
*Burton & Parker*
ATTORNEYS

United States Patent Office 3,438,664
Patented Apr. 15, 1969

3,438,664
STRUCTURAL ASSEMBLY AND CLIP
Engelbert A. Meyer, Union Lake, Mich., assignor to Warren Fastener Corporation, Mount Clemens, Mich., a corporation of Michigan
Filed Nov. 7, 1967, Ser. No. 681,446
Int. Cl. F16b 1/00, 3/00 5/00
U.S. Cl. 287—189.36    16 Claims

ABSTRACT OF THE DISCLOSURE

A structural assembly including a support having a stud extending from the surface thereof, a structural member overlying the support and an improved sheet metal clip secured to the stud and retaining the member on the support. The clip includes a stud receiving slot whose marginal edges have a beveled cutting edge defining an acute angle with the top of the clip. The opposed cutting edges of the clip are parallel and form opposed notches in the softer stud, in which the marginal edges of the clip are received.

Field of the invention

This invention relates to an improved clip or threadless nut adapted to form notches in a softer headless threadless stud, and a structural assembly including such a clip. The improved fastener of my invention is particularly, although not exclusively, useful in the automotive and appliance industries to secure body and accessory parts, and in the building industry to secure structural members.

Description of the prior art

The sheet metal clips shown by the prior art are generally intended to be secured to a stud having a head portion, or a perforated groove adapted to receive the clip. Such clips are therefore limited in their application to structural assemblies having a stud head means accurately spaced from the plane of the structural support. Examples of clips shown by the prior art include the following United States patents: 1,820,825; 2,034,559; 2,203,397; 2,236,130; 2,353,933; 2,358,837; 2,364,880; 2,367,109; 2,405,476; 3,297,916; and British Patent No. 400,397.

United States Patents 2,353,933 and 2,367,109 indicate that the slot of the clip may be dimensioned to frictionally grip the nail or stud, however frictional retention alone is not sufficient for most applications, and the references are therefore only pertinent to the general structure of the disclosed clip.

The clips shown by the prior art which bite into the stud are generally provided with an aperture received over the stud, and require special installation tools. The clips generally have opposed angularly related tongues which normally extend upwardly toward the axis of the stud to resist withdrawal therefrom. An example of such studs includes the Tinnerman fasteners, now well known in the art.

A modification in this type of fastener is shown by United States Patent No. 2,798,406. The embodiment disclosed in FIGURES 1 to 5 of the above referenced patent is bowed in the axis of the slot to tension the clip against the support structure, similar to the clip of my invention, however the slot is tapered and the opposed flanges taper upwardly toward the axis of the stud to provide a right angle cutting edge at the bottom edge of the flanges. The clip may therefore be biased out of the groove, and the clip is bowed perpendicular to the axis of the slot which permits lateral motion of the flanges, and therefore does not provide as secure a connection.

Summary of the invention

The structural assembly of my invention includes a support having a stud extending from the surface thereof, a structural member overlying the support and a sheet metal clip means received on the stud retaining the member to the support in overlying relation. The clip means includes a slot of a width slightly less than the width of the stud, and the opposed marginal edges of the slot have beveled cutting edges defined at an acute angle to the upper surface of the clip. The body portion is preferably reinforced to prevent spreading of the marginal edges during securement of the clip on the stud, causing the cutting edges to form opposed notches in the stud, in which the marginal edges of the clip are then received.

In the preferred embodiment of the clip, the clip is bowed in the axis of the slot to define an inclined ramp portion adjacent the forward end of the clip including the slot, and a stud seat adjacent the rearward end of the slot. The stud seat is off-set below the axial extent of the inclined ramp portion to prevent withdrawal of the clip from the stud in the axis of the notches. The notches formed in the stud are generally V-shaped, having an upper inner wall generally parallel to the upper surface of the marginal edges, and an overhanging lip which prevents withdrawal of the clip through the vertical axis of the stud. The reinforcement of the clip may be provided by the fold in the clip defining the off-set, which is generally perpendicular to the axis of the slot, and by the forward and rearward ends of the clip which are bent upwardly to provide a smooth structural member engaging portion.

The slot of one embodiment of the clip of my invention extends through the end of the clip to permit receipt of the clip between two structural members received on the stud. In this embodiment, the entrance of the slot is flared at an angle to provide initial contact of the clip with the stud by the cuting edges. In the other embodiment, the leading end of the clip includes an enlarged opening which is adapted to be received over the stud, and the leading end of the clip is closed to provide additional structural reinforcement for the marginal edges of the slot.

The clip of my invention may be secured to the stud by hand, with conventional hand tools. In the preferred embodiment of my invention, the rearward end of the clip extends upwardly from the supported structure, generally parallel to the axis of the stud, permitting the clip to be secured in place by conventional pliers biased against the rearward end of the clip and the stud. The clip of my invention may therefore be secured in place without noise, which is an important factor in many assembly operations.

The clip of my invention may be secured at any distance from the support and therefore may be utilized with a stud formed from conventional wire stock, cut to various lengths and welded or otherwise secured to the support surface. The thickness and shape of the supported structure may be varied without modification of the fastener assembly. The fastener may also be used on a variable surface, such as a rubber mat, and will exert constant pressure to function as a floating spacer. Further, in the embodiment of the clip of my invention having a slot extending through the edge of the clip, the clip may be secured between structural members because the clip does not rely on hold down pressure because the fastener cuts its own retaining grooves or notches.

Other objects, advantages, and meritorious features of this invention will more fully appear from the following specification, claims, and accompanying drawings, wherein:

Brief description of the drawings

FIGURE 1 is a side, partially cross sectioned view of the structural assembly of my invention prior to attachment of the clip;

FIGURE 2 is a top view of the sturctural assembly shown in FIGURE 1;

FIGURE 3 is a side view, partially cross sectioned, of the structural assembly shown in FIGURE 1 with the clip means partially received on the stud;

FIGURE 4 is a top view of the structural assembly shown in FIGURES 1 to 3 after securement of the clip on the stud;

FIGURE 5 is a partially cross section side view of the structural assembly shown in FIGURE 4;

FIGURE 6 is an end view partially cross sectioned of the assembly shown in FIGURES 4 and 5;

Description of the preferred embodiments

Figure 7:
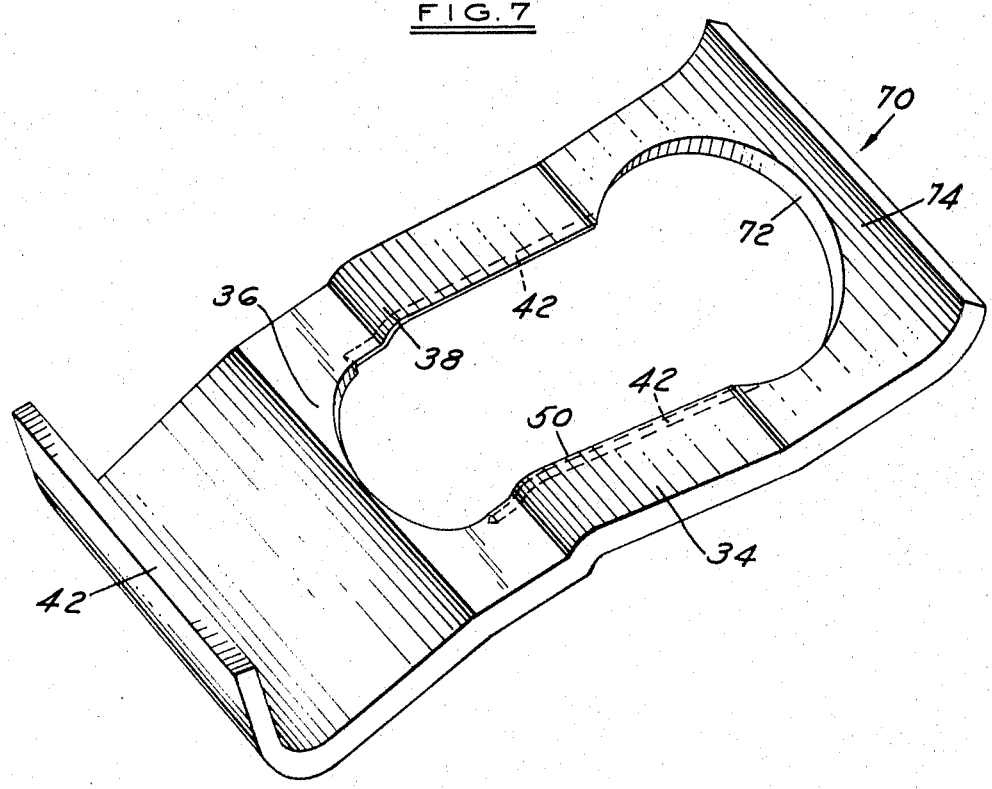
FIGURE 7 is a top perspective view of another embodiment of the clip means of my invention.

The structural assembly shown in FIGURES 1 to 6 includes a support 20 having a stud 22 secured to the support surface, a structural member 24 overlying the support having an aperture 26 received over the stud, and a sheet metal clip 28 retaining the member to the support. The clip of this embodiment of my invention has a slot 32 which receives the stud and tensions the structural member 24 against the support, as shown in FIGURE 5. The stud may be welded to the support, as shown at 30 in FIGURE 1, or it may be secured to the support by various means including adhesive bonding. The support 20 and the structural member 24 may be an automotive body panel and an accessory, or any combination of structural members including a resilient member.

The body portion of this embodiment of the clip is bowed in the axis of the slot, as shown in FIGURE 1, to define an inclined ramp portion 34 and a stud seat 36. The stud seat is off-set from the axial extent of the ramp portion by a fold or crease 38 in the body portion generally perpendicular to the axis of the slot. The forward and rearward ends, 40 and 42 respectively, of the clip are turned upwardly to prevent marring of the surface of the supported structure 24 during assembly, and to prevent spreading of the marginal edges of the slot as described hereinbelow.

The opposed marginal edges 42 of the slot are parallel, and have a beveled edge 44, as shown in FIGURE 6. The beveled edge may be coined when the clip is formed, or formed by other suitable means. The slot in this embodiment extends through the forward end 40 of the clip, and the entrance is flared at an acute angle, as shown at 46 of FIGURE 2, such that the cutting edges will first contact the stud at 48, as shown in FIGURES 1 and 2, and center the clip on the stud prior to final assembly. The beveled edges 46 define an acute angle with the upper surface of the clip, as shown in FIGURE 6, to define a cutting edge 50 adjacent the upper inner end of the beveled surface. The cutting edges 50 in this embodiment are approximately 0.005 inches in width, as shown in FIGURE 6, because of the commercial impracticability of cutting an exact knife edge.

The clip may be secured to the stud with pliers or other suitable hand tools, or special tools or power tools may be utilized in mass assembly operations. The jaws of the pliers are biased against the rearward end 42 of the clip, which extends substantially parallel to the vertical axis of the stud, and the opposed surface of the stud. This forces the stud into the slot 32 of the clip. In the preferred embodiment of the clip of my invention, the clip is reinforced to limit spreading of the marginal edges of the slot, as the clip is received on the stud. The reinforcement of this embodiment is provided by the fold 38 of the off-set, and the upturned ends 40 and 42 which are generally perpendicular to the axis of the slot. Further reinforcement is provided by the fact that the marginal edges of the slot lie in the plane of the body portion of the clip, when viewed perpendicular to the axis of the slot, rather than inclined toward the axis of the stud, as in the "Tinnerman-type" clips.

The cutting edges 50 begin to form opposed notches 52 in the stud at the contact points 48. As the clip is further forced toward the stud in the newly formed notches, the ramp portion tensions the clip ends 54 and 56 against the supported structure 24, causing the cutting edges to "plow" upwardly into the softer stud, as shown in FIGURE 3, forming an overhanging lip 58. The lip is formed from the metal displaced from the notches 52, and results from the unique structure of the cutting edges in combination with the inclined ramp portion 34. The mid portion or stud seat 36 continues to be biased toward the support until the fold or crease 38 passes through the mid portion of the notches 52, as shown in FIGURE 3. When the fold has passed beyond the notches, the clip snaps upwardly, and the ramp portion 34 slips out of the track of the notches as shown in FIGURE 5, inhibiting removal of the clip in the axis of the notches. The clip must be biased downwardly and simultaneously forced away from the stud to remove the clip from the stud. The overhanging lip 58 will prevent removal of the clip in the axis of the stud, and the rearward end of the slot is contoured to receive the stud and prevent further movement. In fact, an attempt to force the clip upwardly would cause the cutting edges to dig further into the stud, requiring fracture of the clip to remove it.

The cross sectional configuration of the slot is best shown in FIGURE 6. As the clip is forced onto the stud, the cutting edges dig deeper into the stud, forming generally V-shaped notches; with the upper inner surface 60 generally parallel to the upper surface of the clip. The side configuration of the notches is generally triangular, as shown in FIGURE 5, because the tension of the ramp portion forces the clip upwardly, as the cutting edges proceed into the notches.

Figure 8:
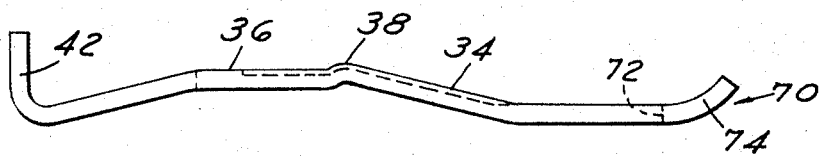
FIGURE 8 is a side view of the clip means shown in FIGURE 7.

The embodiment of the clip shown in FIGURES 7 and 8 is quite similar to the embodiment described hereinabove, except that the leading end of the clip is provided with an enlarged opening 72, which receives the stud prior to final assembly. The forward end of the slot is closed by a bridging portion 74, which further reinforces the clip to prevent spreading of the marginal edges 42 during securement of the clip on the stud. The bridging portion will also prevent tangling of the clips when a number of clips are stored together. The clip illustrated in FIGURES 1 to 6 does however have the advantage that it may be secured to the stud between structural elements, as the slot is formed through the leading end of the clip. The other structural details of the clip shown in FIGURES 7 and 8 may be identical to the clip shown in FIGURES 1 to 6, and have been numbered accordingly.

It will be understood by those skilled in the art that various materials may be used for the elements of the structural assembly of my invention, and the configuration of the support 20 and the structural member 24 has been shown for illustrative purposes only. The stud, however, must be formed of a softer material than the sheet metal clip, and therefore may be formed from such materials as soft annealed steel wire, such as ASE 1008, or "dead soft" steel wire. Other suitable materials for the stud include various plastics, aluminum, and brass. The sheet metal clip is preferably resilient, and may be formed from such materials as SAE 1050 steel tempered to a hardness of C44 to 47 Rockwell.

What is claimed is:

1. A one piece sheet metal clip adapted to be secured on a softer stud, comprising: a body portion defining a stud receiving slot and an enlarged passage communicating with the slot adapted to receive the stud, the opposed marginal edges of said slot being substantially parallel and lying in the plane of said body portion transverse to the axis of the slot, said opposed marginal edges each having a continuous bevelled cutting edge intersecting the upper surface of said body portion, and defining an acute angle therewith, said body portion including a ramp inclined upwardly from said enlarged passage and defined in the axis of said slot resiliently biasing the clip downwardly as it is received on the stud, and said body portion having a means preventing spreading of said marginal edges including a downwardly deformed portion intersecting said slot and transverse to the axis of said slot causing said cutting edges to form opposed notches in the stud in which said marginal edges are to be received.

2. The clip defined in claim 1, characterized in that said body portion includes a stud seat portion at the end of said slot, said stud seat portion off-set below the vertical extent of said ramp portion to prevent withdrawal of said clip in the axis of the notches formed by said cutting edges in the ramp portion.

3. The clip defined in claim 2, characterized in that the off-set is defined by a fold in the body portion generally perpendicular to the axis of the slot.

4. The clip defined in claim 1, characterized in that said enlarged passage includes an enlarged opening adjacent the leading end of the clip having a diameter greater than the diameter of the stud permitting receipt of the clip over the stud.

5. The clip defined in claim 1, characterized in that the opposed ends of said clip are turned upwardly to prevent marring of the support by the clip.

6. A structural assembly, including a support having a stud extending from the surface thereof, a structural member overlying said support and a one piece sheet metal clip means of a material harder than that of said stud received on said stud and retaining said member to said support, said clip means including a body portion defining a stud receiving slot of a width slightly less than the width of said stud and an enlarged stud receiving passage in communication with said slot, the opposed marginal edges of said slot being generally parallel and lying in the plane of said body portion and substantially transverse to the axis of said slot, each of said edges having a continuous bevelled cutting edge intersecting the upper surface of said body portion, and defining an acute angle therewith, said body portion including a ramp inclined upwardly from said enlarged passage and defined in the axis of said slot resiliently biasing the clip downwardly as it is received on the stud, and said body portion reinforced to prevent spreading of said marginal edges, causing said cutting edges to form opposed notches in the stud in which said marginal edges are received.

7. The structural assembly defined in claim 6, characterized in that said sheet metal clip is bowed in the axis of said slot to define the inclined ramp portion, and a stud seat adjacent the rearward end of said slot, said stud seat off-set below the axial extent of said inclined ramp portion to prevent withdrawal of said clip from said stud in the axis of said notches.

8. The structural assembly defined in claim 7, characterized in that said opposed notches in said stud are generally V-shaped having an upper inner wall generally parallel to the upper surface of said marginal edges, and an overhanging lip preventing withdrawal of said clip through the vertical axis of said stud.

9. The structural assembly defined in claim 7, characterized in that said opposed marginal edges of said slot lie in the plane of said ramp portion viewed perpendicular to the axis of said slot.

10. The structural assembly defined in claim 7, characterized in that said stud seat is off-set below the axial extent of said ramp portion by a fold in the clip means generally perpendicular to the axis of said stud.

11. The structural assembly defined in claim 10, characterized in that said stud seat is defined in a planar portion of said clip means and said clip means is tensioned against said structural member at the opposed ends of said clip.

12. The structural assembly defined in claim 11, characterized in that said opposed ends of said clips are turned upward from the plane of said structural member to prevent marring thereof during receipt of said clip means on said stud.

13. The structural assembly defined in claim 12, characterized in that said slot extends through the end of said clip and the entrance to said slot defines said enlarged stud receiving passage and is flared at an angle to provide initial contact of the clip with the stud by said cutting edges.

14. The structural assembly defined in claim 12, characterized in that the leading end of said clip includes an enlarged opening defining said stud receiving passage adapted to be received over the stud and the leading end of the clip is closed to provide structural reinforcement for the marginal edges of said slot.

15. The structural assembly defined in claim 6, characterized in that the rearward end of said clip extends upwardly from said structural member substantially parallel to the axis of said stud permitting attachment of said clip with a conventional pliers.

16. The structural assembly defined in claim 6, characterized in that the width of said slot is ten to fifteen percent smaller than the width of said stud.

References Cited
UNITED STATES PATENTS

| | | | |
|---|---|---|---|
| 2,686,687 | 8/1954 | Singleton | 85—8.8 |
| 2,203,397 | 6/1940 | Taylor | 85—36 |
| 2,353,933 | 7/1944 | Schneider | 85—8.8 |
| 2,358,890 | 9/1944 | Tinnerman | 85—36 |
| 2,574,107 | 11/1951 | Joy | 85—36 |
| 2,895,370 | 7/1959 | Hamann | 85—36 |

CARL W. TOMLIN, *Primary Examiner.*

R. S. BRITTS, *Assistant Examiner.*

U.S. Cl. X.R.

85—36; 249—219; 254—29